United States Patent
Bueno Lopez

(10) Patent No.: US 6,192,926 B1
(45) Date of Patent: Feb. 27, 2001

(54) SAFETY VALVE ESPECIALLY FOR PNEUMATIC CIRCUITS

(76) Inventor: José Bueno Lopez, C. Dr. Josep Castells, 14 Pol. Salas, 08830 Sant Boi Del Llobregat (ES)

(*) Notice: Subject to any disclaimer, the term of this patent is extended or adjusted under 35 U.S.C. 154(b) by 0 days.

(21) Appl. No.: 09/420,378

(22) Filed: Oct. 19, 1999

(30) Foreign Application Priority Data

Oct. 19, 1998 (ES) .................................................. 9802172

(51) Int. Cl.⁷ .................................................. F16K 15/03
(52) U.S. Cl. ..................................... 137/527.8; 137/515.7
(58) Field of Search .............................. 137/527.8, 515.7, 137/527.6, 531

(56) References Cited

U.S. PATENT DOCUMENTS

| | | | |
|---|---|---|---|
| 1,018,569 | * 2/1912 | Kelty | 137/527.8 |
| 2,048,088 | * 7/1936 | Wagner | 137/527.8 |
| 2,637,264 | * 5/1953 | Harmon | 137/527.8 |
| 3,783,893 | * 1/1974 | Davison | 137/527.8 |
| 4,266,569 | * 5/1981 | Wilson | 137/527.8 |
| 4,353,390 | * 10/1982 | Karpenko | 137/527.8 |
| 4,473,526 | * 9/1984 | Buhler et al. | 264/517 |
| 5,031,659 | * 7/1991 | Gonzales et al. | 137/527.8 |
| 5,738,087 | * 4/1998 | King | 137/527.8 |
| 5,921,862 | * 7/1999 | Ucciardi | 137/527.8 |

* cited by examiner

*Primary Examiner*—John Rivell
(74) *Attorney, Agent, or Firm*—Steinberg & Raskin, P.C.

(57) ABSTRACT

It comprises a body provided with an inlet and an outlet; a moving gate which separates said inlet and said outlet; a seat formed on said body and adapted for said gate to rest against it; hinge means of the gate to the body of the valve; and means for keeping the gate in position against the seat, the latter comprising a body attached to one end of the gate, the gate and said body being hinged to the valve body in such a way that both can rotate around a single hinge pin, which is arranged eccentrically with respect to said body attached to the gate, so that the gate is kept in equilibrium when the pressure inside the valve exceeds 0.1 bar. The pin is aligned with the point of contact between the gate and the seat of the valve body and is detachable.

12 Claims, 2 Drawing Sheets

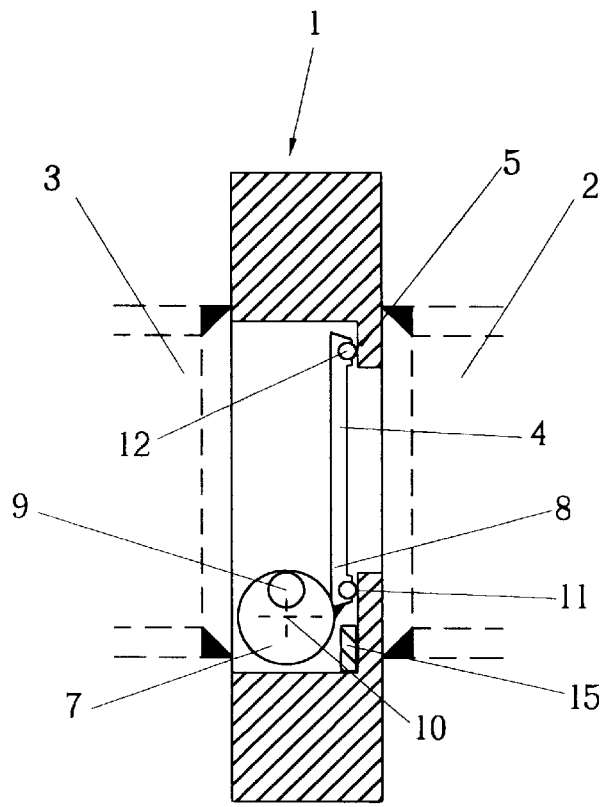
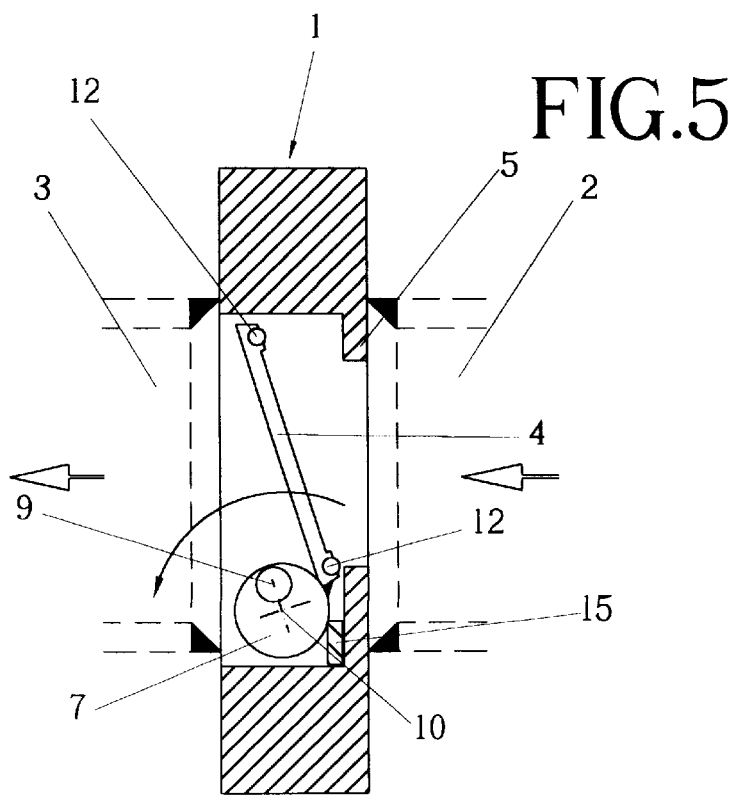

SAFETY VALVE ESPECIALLY FOR PNEUMATIC CIRCUITS

FIELD OF THE INVENTION

The present invention relates to a safety valve of the type used to regulate the pressure in fluid-transporting installations. More specifically, the invention relates to a safety valve for use in pneumatic circuits.

BACKGROUND OF THE INVENTION

Pressure control in a hydraulic circuit is carried out using valves. Known in this respect is the use of safety valves, or relief valves, in order to maintain a constant pressure in the hydraulic circuit and thereby prevent pressure peaks which could harm the various parts of said circuit. These pressure peaks, which can give rise to the phenomenon of water hammer, must therefore be controlled effectively.

Conventional safety valves, used mainly in hydraulic circuits, essentially comprise a body provided with an inlet and an outlet, a closing element or gate which is mounted hinged to the valve body and which divides the aforesaid inlet and outlet, a seat formed in said body and against which said gate rests, hinge means of the gate on the valve body, and means for keeping the gate in position against the seat. One of the main disadvantages presented by this type of valve, and more specifically the valves known as "clapet" valves, is that when a large volume of fluid has to be evacuated the means to keep the gate in position can generate considerable pressure variations which are a function of the movement of the gate, which in turn depends on the different quantities of fluid to be evacuated.

The disadvantages are considerably greater when this type of valve is used in pneumatic circuits. This is the case due to the fact that the effect of water hammer is more critical. The flow of air in a pneumatic circuit causes the gate to undergo an oscillatory movement which is harmful to it. Indeed, it has been found in practice that the gates of these valves fail by breakage of their hinge pin due to fatigue. Gate failure is extremely important from a technical point of view and from a financial point of view. In installations which work with a pneumatic circuit with large air flows, as, for example, the circuits for sewage water treatment plants or vacuum installations, operation of the installations must be stopped every 2 or 3 months in order to replace the valves. This has a negative effect on the cost of maintenance of the installation and means that a schedule of operation of the installation must be drawn up in function of the maintenance stops that have to be carried out ever so often.

It must further be taken into account that the problems deriving from failure of conventional safety valves can, for example, cause a pneumatic valve to turn in opposite direction due to overpressure in the system, thereby causing breakdown of that system.

The prior art comprises valves with a structural arrangement designed to reduce the cited oscillatory movement of the gate and, therefore, what is called the "flag effect". Some solutions have been proposed in this respect in an attempt to reduce said effect, although such configurations result in a design that is too expensive for the installation.

OBJECTS AND SUMMARY OF THE INVENTION

The aim of the present invention is to provide a valve which can be fitted in a pneumatic circuit and which has structural characteristics capable of solving all the disadvantages presented by the valves included in the state of the art.

Another aim of the invention is to provide a valve that is very simple to manufacture, which comprises a small number of parts and whose functioning is effective under any working conditions.

The valve of this invention, which will be described below, achieves both aims, and has a cost significantly lower than the valves used for the same purpose under the prior art.

Along general lines, the valve of the invention is of the type described above, that is, one that basically comprises a body with an inlet and an outlet, a moving gate that separates said inlet and said outlet, a seat formed on said body and so designed that said gate rests against it, hinge means of the gate on the valve body and means for keeping the gate in position against the seat.

The special feature of the safety valve of the invention lies in the fact that said means for keeping the gate in position against the seat essentially comprise a body attached to one end of the gate, the gate and said body being hinged to the valve body in such a way that both can rotate around a single hinge pin. Said hinge pin is arranged eccentrically with respect to said body attached to the gate, in such a way that the gate is kept in equilibrium when the pressure inside the valve exceeds 0.1 bar.

The layout and structure of said means for keeping the gate in position against the seat allow the position of the centre of gravity of the gate with respect to its hinge pin to be altered. In this respect, the body which is attached to the gate and rotates together with it around a single hinge pin mounted eccentrically with respect to said body allows it to act as a counterweight to eliminate the "flag effect" of the valve gate, that is, its oscillatory movement. Breakages of the pin due to fatigue are thus reduced considerably, and as a result the servicing intervals for the installation and, in short, the useful life of the valve, are lengthened.

In accordance with the invention, the hinge pin is aligned with the point of contact between the gate and the seat of the valve body. The design of the valve thus conceived allows to guarantee the fluidtightness of the unit and, therefore, the regularity of the advance caused by the flow of the pump, thus assisting correct operation of the system. In this respect, sealing means are fitted between the gate and the seat of the valve, preferably consisting in an O-ring.

In order to facilitate maintenance operations, where such are required, the invention makes provision for the gate hinge pin to be detachable.

BRIEF DESCRIPTION OF THE DRAWINGS

Other characteristics and advantages of the valve of the invention will become clear from the following description of a practical embodiment of the invention that is not exclusive in nature, but rather provides an illustration by way of non-restrictive example. The description in question relates to the drawings attached, which have the objective of clarifying the description of what has been outlined earlier in this specification. Other embodiments of the valve will thus be obvious to an expert in the subject, all of which are included within the sphere of this invention. In said drawings:

FIG. 4 is an enlarged view of the valve of FIG. 1, shown in closed position;

and FIG. 5 is a view similar to that of FIG. 4, but with the valve shown in opening position.

DETAILED DESCRIPTION OF THE INVENTION

Figure 1:
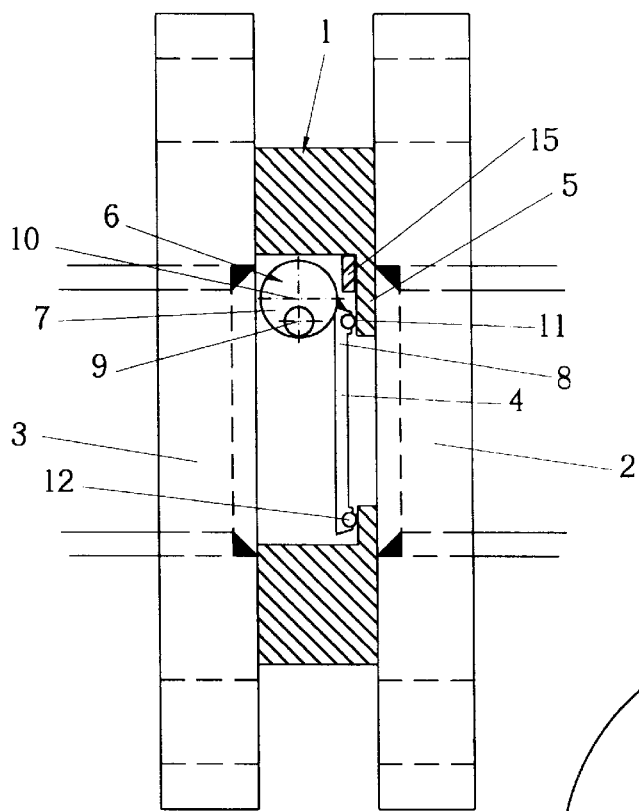
FIG. 1 is a section view of a valve in accordance with the invention.
Figure 2:
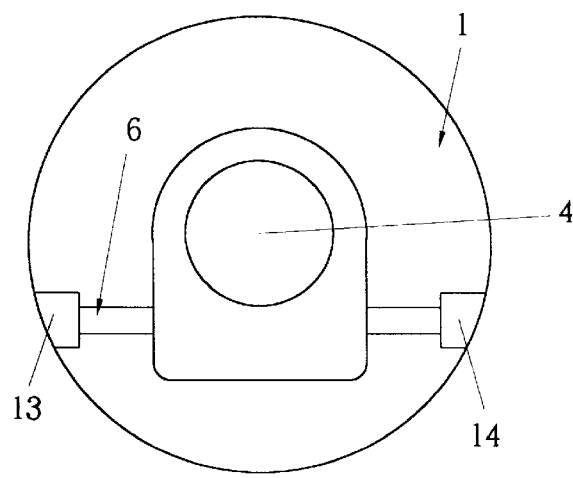
FIG. 2 is a plan view of the valve of FIG. 1.
Figure 3:
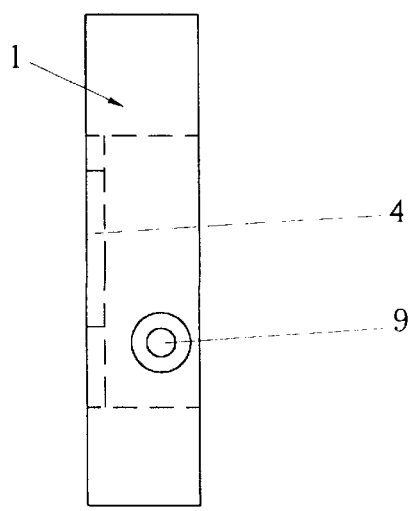
FIG. 3 is an elevation view of the aforesaid valve of FIG. 1.

As can be appreciated from the figures, the safety valve, especially for pneumatic circuits, includes a body 1 provided with an inlet 2 and an outlet 3; a moving gate 4 which separates said inlet 2 and said outlet 3; a seat 5 formed on said body 1 and designed so that said moving gate 4 rests on it; hinge means for articulation of the gate on the valve body 1; and means for keeping the gate 4 in position against the seat 5. Said means consist in a body 7 attached to one end 8 of the gate 4. The gate 4 and said body 7 are welded in such a way that both can rotate around a single hinge pin 9 which is mounted eccentrically with respect to said body 7 attached to the gate 4. The gate 4 is thus kept in equilibrium when the pressure inside the valve is greater than a minimum pressure value which depends on the relative position of the pin 9 with respect to the geometrical axis 10 of the body 7. Said dependence can also be established between the weight of said body 7 and that of the gate 4. This relationship has been established in such a way that the gate is in equilibrium for a minimum pressure of 0.1 bar. This minimum pressure value is sufficient to eliminate the "flag effect" of the gate described above, taking into account that the service pressure of pneumatic circuits of the type used to transport large flows, as has been described, is around 1 bar.

The eccentricity of the hinge pin 9 with respect to the geometric axis 10 of the body 7 permits the position of the centre of gravity of the gate and of the body (4;7) to be altered when the gate 4 turns during operation of the valve, that is, the body 7 acts as a counterweight and thus permits a considerable reduction of breakages of the pin 9 due to fatigue.

As can be seen from the figures, the hinge pin 9 is aligned with the point of contact 11 between the gate 4 and the seat 5 of the valve body 1, which ensures fluidtightness of the unit and correct running of the system.

The placement of sealing means between the gate 4 and the seat 5 of the valve can be appreciated clearly, these means preferably consisting of an O-ring of suitable material, such as neoprene.

In order to facilitate maintenance, the hinge pin 9 is detachable. Furthermore, the ends 13,14 of said pin 9 are designed to receive protecting plugs (not shown) to prevent access to the pin. The hinge pin 9 is mounted inside the body 7 with a play of 0.7–0.8 mm so as to suitably set the alignment of said pin 9 with the point of contact 11.

As can be seen in FIGS. 1, 4 and 5, a portion of the seat 5 is extended to form a projection 15 whose height is designed to act as a stop of the body 7 upon opening.

Without departing from the essential nature of the object of the present invention or the scope defined by the claims included below, all accessory details and elements, together with the shapes and dimensions of the valve of the invention, may be suitably replaced by others which are technically equivalent.

What is claimed is:

1. A safety valve, especially for pneumatic circuits, which comprises:
    a body provided with an inlet and an outlet;
    a moving gate which separates said inlet from said outlet;
    a seat formed on said body and adapted for said gate to rest against it;
    hinge means for attaching the gate to the body of the valve; and
    means for keeping the gate in position against the seat; wherein said means for keeping the gate in position against the seat comprise a body attached to one end of the gate, said body being eccentrically hinged to the valve body in such a way that said body and the gate can rotate around a single hinge pin, said hinge pin being eccentrically arranged with respect to the geometric axis of said body such that the gate is kept in an open non-oscillating state when the pressure inside the valve exceeds 0.1 bar.

2. A valve as claimed in claim 1, wherein said hinge pin is aligned with the point of contact between the gate and the seat of the valve body.

3. A valve as claimed in claim 2, wherein the hinge pin of the gate is detachable.

4. A valve as claimed in claim 1, including sealing means fitted between the gate and the seat of the valve.

5. A valve as claimed in claim 4, wherein said sealing means comprise an O-ring.

6. The safety valve according to claim 1, wherein said gate is tangentially attached to said body.

7. A pneumatic safety valve comprising:
    a body having an inlet and an outlet;
    a movable gate interposed between said inlet and outlet;
    a seat formed on said body structured and arranged to receive said movable gate;
    hinge means structured and arranged to pivotally attach said movable gate to said body;
    said hinge means comprising a member mounted to said body by a hinge pin passing through an eccentric location with respect to the geometric axis of said member, said movable gate being fixedly attached to said member so that said movable gate is pivotally movable with said member, the eccentric location of said hinge pin with respect to said member thereby maintaining said gate in an open non-oscillating state when a pressure inside said valve exceeds 0.1 bar.

8. A pneumatic safety valve as claimed in claim 7, wherein said hinge pin is aligned with a point of contact between said gate and said seat.

9. A pneumatic safety valve as claimed in claim 8, wherein said hinge pin is detachable.

10. A pneumatic safety valve as claimed in claim 7, including sealing means fitted between said gate and said seat.

11. A pneumatic safety valve as claimed in claim 10, wherein said sealing means comprises an O-ring.

12. The safety valve according to claim 7, wherein said gate is tangentially attached to said member.

* * * * *